Patented Sept. 2, 1952

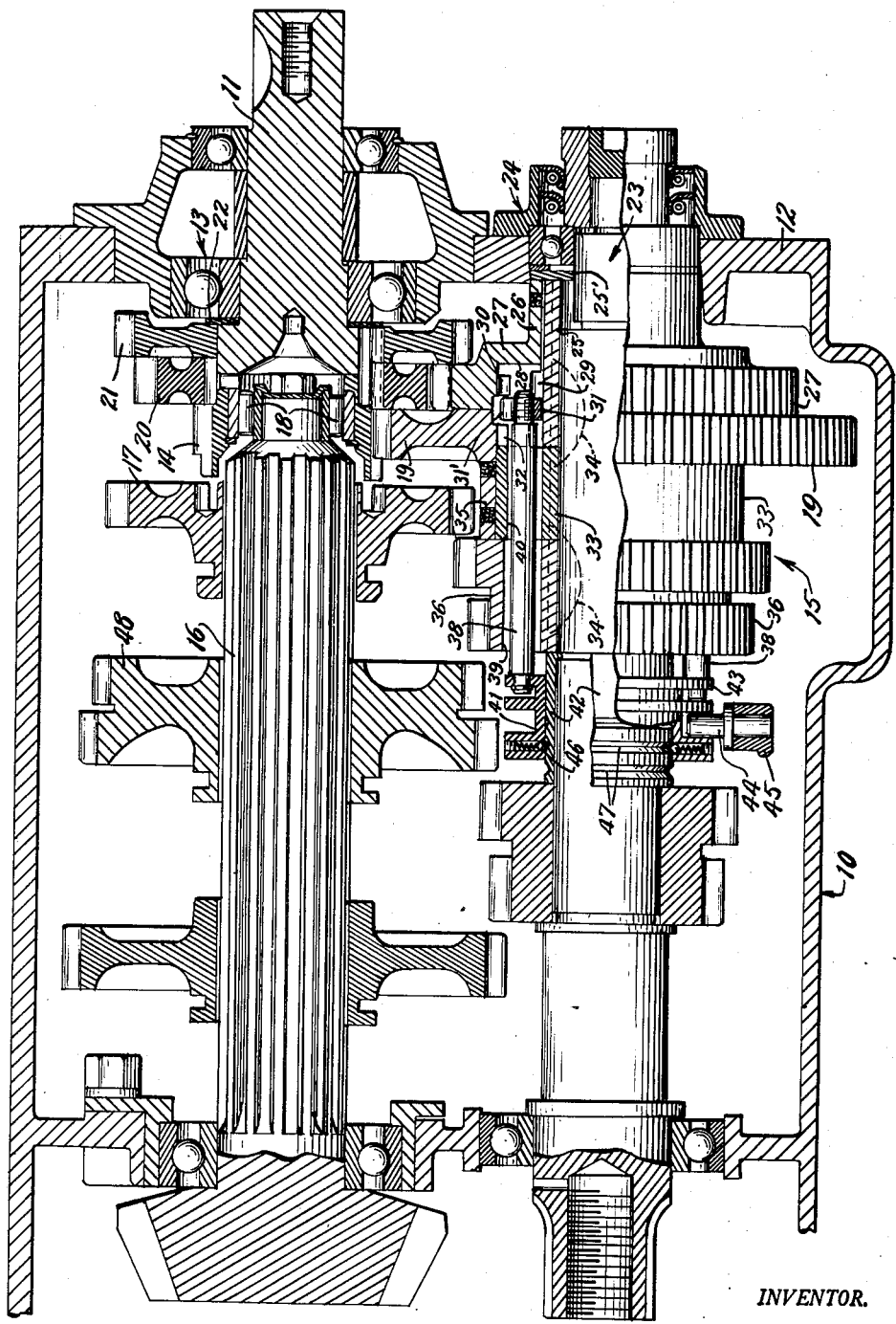

2,608,878

UNITED STATES PATENT OFFICE 2,608,878

DUAL SPEED COUNTERSHAFT ASSEMBLY

Arthur J. Warsaw, Anchor, Ill.

Application July 17, 1950, Serial No. 174,200

10 Claims. (Cl. 74—375)

The present invention relates to structural improvements in the tractor overdrive assembly shown and described in my copending application for Letters Patent, Serial No. 58,488, filed November 5, 1948. Specifically, the improvements enable the manufacture and installation of that assembly to be facilitated and reduced in cost, as well as considerably improving the latter with regard to ruggedness and effectiveness of operation.

The aforesaid tractor overdrive affords an additional complete set of speed ratios for a conventional, standard tractor transmission, over and above the usual set of speeds, and an important advantage thereof is that it may be installed as an adapter unit in the existing tractor housing space without redesign of the housing and with very little work. However, it has been found that some of the thrust, end retaining and bearing provisions for the components of the assembly in question are apt to cause some difficulty in assembling and dismantling for installation or servicing, likewise that the stability of support for certain of the parts can be improved on. Furthermore, the assembly shown in the application referred to is characterized by a considerable number of telescoped, concentric parts; this requires a relatively high degree of precision in manufacture to provide necessary close tolerances, in order to avoid the cumulative effect of a number of loose clearances, running or stationary.

It is therefore an object of the present invention to provide an improved assembly of the general sort referred to above, characterized by its compactness and economy and simplicity of parts, with resultant increased ease of assembling, disassembling and servicing; by a substantially greater stability in the bearing provisions for its relatively rotatable parts; and by its decreased cost of manufacture, due to the fact that precision manufacturing operations are reduced to a minimum.

More specifically, it is an object of the invention to provide an improved dual speed transmission countershaft assembly for a tractor overdrive construction of the type referred to above, the latter characterized by an axially shiftable clutch ring on the countershaft which is selectively engageable with clutch teeth on a pair of adjacent countershaft gears to set up standard or auxiliary main shaft driving relationships through the countershaft, in which assembly improved and greatly simplified provision is made for axially shifting the ring, enabling the countershaft gearing to be substantialy compacted, reduced in the number of its parts and generally rendered more stable and effective in operation.

Still more specifically, it is an object to provide a dual speed countershaft assembly including a countershaft mounted clutch ring of the sort referred to and a coaxial shifter collar located remote from said ring and slidable on the countershaft, together with improved means for operatively connecting said collar with the ring in the form of one or more thrust rods secured to the collar and ring at their opposite ends and extending through certain intervening gearing and/or bearing members which are mounted on and rotate with the countershaft, the arrangement being such that these members and the countershaft gears which are selectively engaged by the clutch ring may be mounted in very compact, side-by-side adjacency to one another.

Another object of the invention is to provide a dual speed countershaft assembly of the type referred to above, wherein the shifting collar is located in a normally existing, neutral space between two existing, aligned gears or sets of gears on the countershaft, thereby adapting the assembly for installation on any existing type of tractor transmission in which such a neutral space is present, without requiring a change in the transmission in this respect.

A further object is to provide a dual speed countershaft assembly characterized by an arrangement of two countershaft driven gears in immediate side-by-side relation to one another and in constant mesh engagement with main shaft driving gears, an axially shiftable clutch ring drivingly mounted on a rotating countershaft sleeve and slidable thereon for engagement with one or the other of the countershaft driven gears, a coaxial bearing on which one of said countershaft gears is rotatably journalled, being preferably in completely telescoped relation within said gear, and a coaxial cluster gear immediately adjoining the bearing, plus one or more thrust rods extending forwardly through openings in the cluster gear and bearing and connected at the opposite ends thereof to the clutch ring and to a shifting collar on the countershaft, the arrangement being such as to utilize a normally existing, neutral space on the countershaft for the reception of the collar and thereby to provide a countershaft dual speed unit of maximum compactness and economy of parts, maximum bearing stability and minimum number of relatively rotative components requiring close tolerance machining operation in their production and substantial care in their assembly and installation.

The foregoing statements are indicative in a general way of the nature of the invention. Other and more specific objects will be apparent to those skilled in the art upon a full understanding of the construction and operation of the device.

A single embodiment of the invention is presented herein for purpose of illustration, but it will be appreciated that the invention may be embodied in other modified forms coming equally within the scope of the appended claims.

In the drawings,

The figure is a view in axial or longitudinal section through a standard type of tractor transmission equipped with an overdrive assembly incorporating the dual speed countershaft unit of the present invention.

Referring to the drawing, the reference numeral 10 generally designates a standard tractor transmission housing of the type employed, for example, in the well known model "M" or "H" International Harvester tractor. The main driving shaft 11 of the tractor is rotatably mounted in an end wall 12 of this housing by a roller bearing structure 13. Shaft 11 terminates internally of the housing in an integral driving gear 14 which selectively drives through the dual speed countershaft unit or assembly of the invention, generally designated 15, to the main driven shaft 16 in a well known manner. A conventional ratio change is had by shifting of a standard selector gear 17 splined on the driven shaft, out of or into direct driving relation to drive gear 14. This selector is shifted by any well known provision, and the functioning of the transmission is, in respect to the same, entirely conventional. The main driven shaft 16 is journalled by an internal pilot bearing 18 in the end of drive shaft 11 in an equally well known manner.

Main shaft drive gear 14 is in constant mesh with a first or primary countershaft driven gear 19, to be hereinafter referred to, and the standard set of speed ratios is established through this engagement. A second, auxiliary main shaft driving gear or overdrive drive gear 20 is keyed on shaft 11 in immediate side-by-side relation to the gear 14. A supplemental, power take-off gear 21, adapted to be employed for utility purposes, such as driving an external belt, etc., is similarly keyed to shaft 11 in immediate side-by-side relation to the overdrive driving gear 20. An end thrust washer 22 separates this power take-off gear 21 from the shaft bearing structure 13.

The countershaft of the assembly is designated generally by the reference numeral 23. It has a pilot bearing and is appropriately oil sealed at 24 in the end wall 12 of the housing 10. An elongated bearing and driving sleeve 25 is keyed on the countershaft, this sleeve being located immediately inwardly of an end thrust washer 25'. The right-hand portion of sleeve 25 serves as a bearing on which the elongated hub 26 of an auxiliary countershaft gear or overdrive driven gear 27 is rotatably mounted. The main shaft auxiliary driving gear 20 is in constant mesh with this gear 27 and the bearing portion 26 of sleeve 25 is of sufficient width to provide an adequate and stable bearing surface for the constantly rotating gear 27. The latter is rearwardly recessed at 28 to accommodate an annular set of external jaw clutch teeth 29 which are milled on the left-hand end of sleeve 25, and an annular set of internal jaw clutch teeth 30 is formed around the inner circumferential wall of this recess.

Teeth 30 are adapted for selective engagement by a toothed clutch ring 31 which has axially slidable, splined engagement with the external teeth 29 of the sleeve 25. Clutch ring 31 is provided an external series of jaw clutch teeth 31' for selective engagement with the gear clutch teeth 30 or with corresponding internal clutch teeth 32 formed on the adjacent countershaft driven gear 19, depending upon the axial position of the clutch ring.

A relatively wide surfaced bearing ring 33 is fixedly applied to the countershaft 23, immediately to the left of the driving and bearing sleeve 25, being secured to the shaft by key provision 34 appearing in dotted lines in the figure. The external surface of ring 33 rotatively receives the elongated hub 35 of countershaft gear 19, the latter having sufficient length of bearing on the ring 33 to insure a stable rotating mount for this continuously rotating gear. The bearing ring is preferably entirely housed within the gear hub 35, in immediate side-by-side adjacency to the internal clutch teeth 32 of gear 19, in the interest of axial compactness.

A standard cluster gear 36 is keyed on the countershaft 23 immediately to the rear of the gear hub 35 and bearing ring 33, one of the gear sets of this cluster gear being engageable by the main shaft selector 17 in entirely conventional fashion.

The foregoing arrangement is notable for the compactness of its parts. The adjacent standard and auxiliary countershaft driven gears 19, 27, respectively, afford internal space for the jaw clutch teeth 32, 30 respectively, as well as the axially shiftable clutch ring 31 and the teeth 29 of the driving and bearing sleeve 25 on which the clutch ring slides. To the right of its teeth the sleeve provides an efficient bearing for gear 27, and the bearing ring 33 does likewise for the gear 29, with the additional advantage of extreme axial compactness due to the completely telescoped relation of said bearing ring and last named gear.

The provisions for axially shifting the clutch ring 31 are equally simple and compact. These provisions comprise a plurality of elongated shifter rods 38 which are fixedly secured at their forward end to the clutch ring 31, as by force fit, thread, pinning or the like. Rods 38 extend through the openings 39 formed through the cluster gear 36 and the corresponding, aligned openings 40 formed in the bearing ring 33. Any appropriate number of rods may be employed for the purpose; in an actual installation three proved adequate. Openings 39, 40 may be drilled or cast in the cluster gear and bearing ring, or, alternatively, the ring and/or gear may be of spider-like character to provide necessary axially extending space for the reception of the shifter rods 39. Any of these arrangements accommodate the clutch shifting rods internally of the countershaft gear and bearing structure and thereby promote axial compactness and overall economy of space.

Low cost of manufacture also results, due to the fact that only two rotative running fits need be made in the countershaft assembly, i. e., between the hub 35 of gear 19 and the external cylindrical surface of bearing ring 33 and between the hub 26 of gear 27 and the right-hand bearing portion of the sleeve 25. These surfaces are at different, non-telescoped axial parts, hence relatively free running fits may be employed without resulting in an undesirable cumulative looseness.

Shifter rods 38 are fixedly connected at the rear or left-hand side thereof to an axially shiftable collar 41 which is mounted for sliding movement on a sleeve 42 secured to countershaft 23. The rods may be secured to a radial forward flange 43 of said collar by means of split rings applied to the rod ends immediately behind the flange. Collar 41 is provided with an annular groove which receives a radially extending lug or pin 44 on an axially movable shifter fork 45, in well known fashion. This fork may be actuated by any of various well known provisions, controlled by a lever or pedal which is accessible to the operator of the tractor.

A spring urged ball or balls 46 mounted on the collar 41 coact with annular external grooves 47 on the shaft borne sleeve 42 to retain the collar and the clutch ring 31 controlled thereby in any one of its three possible positions, i. e., to the left in clutching engagement with the internal jaw teeth 32 of standard countershaft gear 19, medially of gears 19, 27, as illustrated in the drawing, which represents a neutral position, or to the right in clutching engagement with the internal teeth 30 of countershaft overdrive or auxiliary gear 27.

It is believed that the operation of the subject dual speed countershaft assembly will be apparent from the foregoing description. The normal driving position of the clutch ring 31 is to the left, in position to transmit power derived from the main driving gear 14 through countershaft driven gear 19 to the countershaft sleeve 25, thence through countershaft 23 to which the sleeve is keyed and through cluster gear 36 keyed on the countershaft either to the main shaft gear 17 or a further main shaft gear 48, in well known manner. This sets the transmission for any of the normal speed ratios. In the neutral position illustrated, the clutch ring 31 idles, the constant mesh countershaft gears 19 and 27 rotating relative thereto on sleeve 25 and bearing ring 33, respectively. In this condition the selector 17 may be clutched to main driving gear 14 for direct drive of shaft 16. When the clutch ring 31 is shifted to the right into engagement with the internal clutch teeth 30 of countershaft overdrive gear 27, an entirely different set of overdrive speed ratios is set up through main shaft overdrive gear 20, gear 27, clutch ring 31, sleeve 25, countershaft 23 and cluster gear 36, due to the difference of diameter of gears 19 and 27.

The present installation may be made in an existing tractor housing, without material change in the latter, in fact without any change to the extent that the internal available space of the housing is concerned. The arrangement is extremely compact, the bearing provisions are ample for satisfactory operation over a long life, the machining involved in the production of the parts is simple and no extensive rearrangement of the existing transmission structure is required. Complicated operations of assembling interior thrust and end retaining elements are avoided. Furthermore, the unit is adapted for any installation which affords a relatively small, unoccupied countershaft space to which the collar 41 may be applied.

I claim:

1. A dual speed countershaft assembly, comprising a driving sleeve adapted to be fixedly mounted on a countershaft, said sleeve being provided with a driving portion, a clutch ring slidable axially on said driving portion in rotatively fixed relation thereto, a member mounted on the countershaft in rotatively fixed relation to said sleeve on one side of the driving portion thereof, and means to shift said clutch ring axially on said sleeve comprising an axially movable element on the countershaft disposed on the side of said member opposite said sleeve driving portion, and an axially extending force transmitting rod secured to said element and clutch ring at opposite ends thereof, said member being provided with an axially extending opening for the reception of the intermediate portion of said rod.

2. A dual speed countershaft assembly, comprising a driving sleeve adapted to be fixedly mounted on a countershaft, said sleeve being provided with a driving portion, a clutch ring slidable axially on said driving portion in rotatively fixed relation thereto, a member mounted on the countershaft in rotatively fixed relation to said sleeve on one side of and immediately adjacent the driving portion thereof, and means to shift said clutch ring axially on said sleeve comprising an axially movable element on the countershaft disposed on the side of said member opposite said sleeve driving portion, and an axially extending force transmitting rod secured to said element and clutch ring at opposite ends thereof, said member being provided with an axially extending, internal opening for the reception of the intermediate portion of said rod.

3. A dual speed countershaft assembly, comprising a driving and bearing sleeve adapted to be fixedly mounted on a countershaft, said sleeve being provided with a driving portion and a bearing portion in side-by-side relation thereto, a clutch ring slidably mounted on said driving portion in rotatively fixed relation thereto, a bearing ring in fixed relation to said sleeve on the side thereof adjacent said driving portion and opposite said bearing portion, said bearing ring having an external circumferential bearing surface of substantial length, gears rotatably mounted on said sleeve bearing portion on said bearing ring bearing surface, respectively, and means to shift said clutch ring axially on said sleeve driving portion for selective driving engagement with said respective gears, comprising an axially movable collar mounted on the countershaft on the side of said bearing ring opposite said sleeve driving portion, and an axially extending shifter rod secured to said collar and clutch ring at opposite ends thereof, said bearing ring being provided with an axially extending opening for the reception of the intermediate portion of said rod.

4. A dual speed countershaft assembly, comprising a driving and bearing sleeve adapted to be fixedly mounted on a countershaft, said sleeve being provided with a driving portion and a bearing portion in side-by-side relation thereto, a clutch ring slidably mounted on said driving portion in rotatively fixed relation thereto, a bearing ring in fixed relation to said sleeve on the side thereof adjacent said driving portion and opposite said bearing portion, said bearing ring having an external circumferential bearing surface of substantial length, first and second gears rotatably mounted on said sleeve bearing portion and on said bearing ring bearing surface, respectively, a further gear on the countershaft in fixed relation to said sleeve adjacent the side of said bearing ring opposite said sleeve driving portion, and means to shift said clutch ring axially on said sleeve driving portion for selective driving engagement with said first and second gears, comprising an axially movable collar mounted on the countershaft on the side of said further gear opposite said bearing ring, and an axially extending shifter rod secured to said collar and clutch ring at opposite ends thereof, said further gear and bearing ring being provided with an axially extending opening for the reception of the intermediate portion of said rod.

5. A dual speed countershaft assembly, comprising an annular countershaft driving element, a clutch ring slidably mounted on said driving element in rotatively fixed relation thereto, an annular, radially extending countershaft member in rotatively fixed relation to said driving element on one side thereof, and means to shift said clutch ring axially on said driving element comprising an axially movable shifter member disposed on the side of said radially extending countershaft member opposite said driving element and an elongated force transmitting member connected to said shifter member and clutch ring at opposite ends thereof and penetrating said radially extending countershaft member.

6. A dual speed countershaft assembly, comprising an annular countershaft driving element, a clutch ring slidably mounted on said driving element in rotatively fixed relation thereto, an annular, radially extending countershaft member in fixed relation to said driving element on one side thereof, said member having an external bearing surface for the reception of a countershaft gear, and means to shift said clutch ring axially on said driving element comprising an axially movable shifter member disposed on the side of said radially extending countershaft member opposite said driving element and an elongated force transmitting member connected to said shifter member and clutch ring at opposite ends thereof and penetrating said radially extending countershaft member.

7. A dual speed countershaft assembly, comprising axially aligned countershaft driving and bearing elements disposed in side-by-side adjacency, a clutch ring slidably mounted on said driving element in rotatively fixed relation thereto, a gear rotatable on said bearing element, a bearing ring axially aligned with said driving element on the side thereof opposite said bearing element, said bearing ring having an external bearing surface of substantial length, a countershaft gear rotatable on said surface, and means to shift said clutch ring axially on said driving element for selective driving engagement with said countershaft gears comprising an axially movable countershaft shifter member disposed on the side of said bearing ring opposite said driving element, and a plurality of elongated force transmitting members connected to said shifter member and clutch ring at opposite ends thereof and penetrating said bearing ring.

8. A dual speed countershaft assembly comprising a sleeve adapted to be secured to a countershaft, a clutch ring slidable on said sleeve in rotatively fixed driving relation thereto, a bearing ring adapted to be secured to said countershaft to one side of said sleeve and clutch ring, a pair of countershaft driven gears rotatively mounted on said bearing ring and sleeve, respectively, said gears being provided with internal clutch teeth adapted to be selectively engaged by said clutch ring, a countershaft gear unit adapted to be secured to the countershaft on the side of said bearing ring opposite said clutch ring, and means for shifting said clutch ring axially on said sleeve comprising a plurality of force transmitting rods connected to the ring and extending axially through said bearing ring and gear unit, said bearing ring and unit being provided with aligned openings therethrough to receive said rods.

9. A dual speed countershaft assembly comprising a sleeve adapted to be secured to a countershaft, a clutch ring slidable on said sleeve in rotatively fixed driving relation thereto, a bearing ring adapted to be secured to said countershaft to one side of said sleeve and clutch ring, a pair of countershaft driven gears rotatively mounted on said bearing ring and sleeve, respectively, said gears being arranged in immediate side-by-side adjacency and in enclosing relation to said clutch ring, and being provided with internal clutch teeth adapted to be selectively engaged by said clutch ring, a countershaft gear unit adapted to be secured to the countershaft on the side of said bearing ring opposite said clutch ring, and means for shifting said clutch ring axially on said sleeve comprising a plurality of force transmitting rods connected to the ring and extending axially through said bearing ring and gear unit, said bearing ring and unit being provided with aligned openings therethrough to receive said rods.

10. A dual speed countershaft assembly comprising a sleeve adapted to be secured to a countershaft, a clutch ring slidable on said sleeve in rotatively fixed driving relation thereto, a bearing ring adapted to be secured to said countershaft to one side of said sleeve and clutch ring, a pair of countershaft driven gears rotatively mounted on said bearing ring and sleeve, respectively, said gears being arranged in immediate side-by-side adjacency and in enclosing relation to said clutch ring, and being provided with internal clutch teeth adapted to be selectively engaged by said clutch ring, said bearing ring and sleeve being provided with axially elongated bearing surfaces and said countershaft driven gears being provided with axially elongated bearing portions extending in opposite directions and journalled on said surfaces, a countershaft gear unit adapted to be secured to the countershaft on the side of said bearing ring opposite said clutch ring, and means for shifting said clutch ring axially on said sleeve comprising a plurality of force transmitting rods connected to the ring and extending axially through said bearing ring and gear unit, said bearing ring and unit being provided with aligned openings therethrough, located within the external periphery thereof to receive said rods.

ARTHUR J. WARSAW.

REFERENCES CITED

The following references are of record in the file of this patent:

UNITED STATES PATENTS

| Number | Name | Date |
|---|---|---|
| 2,398,208 | Chilton | Apr. 9, 1946 |